(12) United States Patent
Wang et al.

(10) Patent No.: US 8,492,730 B2
(45) Date of Patent: Jul. 23, 2013

(54) NEUTRON DETECTORS COMPRISING ULTRA-THIN LAYERS OF BORON POWDER

(75) Inventors: Zhehul Wang, Los Alamos, NM (US); Christopher Morris, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 257 days.

(21) Appl. No.: 12/963,492

(22) Filed: Dec. 8, 2010

(65) Prior Publication Data

US 2012/0161023 A1 Jun. 28, 2012

Related U.S. Application Data

(63) Continuation-in-part of application No. 12/797,141, filed on Jun. 9, 2010.

(60) Provisional application No. 61/187,160, filed on Jun. 15, 2009.

(51) Int. Cl.
*G01T 3/00* (2006.01)

(52) U.S. Cl.
USPC .................................... 250/390.01

(58) Field of Classification Search
USPC .......... 250/390.01, 390.05, 390.08; 257/429, 257/E21.002
See application file for complete search history.

(56) References Cited

U.S. PATENT DOCUMENTS

| | | | | |
|---|---|---|---|---|
| 5,399,863 | A * | 3/1995 | Carron et al. | 250/370.05 |
| 7,002,159 | B2 * | 2/2006 | Lacy | 250/390.01 |
| 2004/0178337 | A1 * | 9/2004 | Kurkoski et al. | 250/269.4 |
| 2008/0017804 | A1 * | 1/2008 | Krishnamoorthy et al. | 250/370.05 |
| 2009/0302226 | A1 * | 12/2009 | Schieber et al. | 250/370.02 |

* cited by examiner

*Primary Examiner* — David Porta
*Assistant Examiner* — Faye Boosalis
(74) *Attorney, Agent, or Firm* — Juliet Ann Jones; Meredith Hope Schoenfeld; Ryan B. Kennedy

(57) ABSTRACT

High-efficiency neutron detector substrate assemblies comprising a first conductive substrate, wherein a first side of the substrate is in direct contact with a first layer of a powder material having a thickness of from about 50 nm to about 250 nm and comprising $^{10}$boron, $^{10}$boron carbide or combinations thereof, and wherein a conductive material is in proximity to the first layer of powder material; and processes of making said neutron detector substrate assemblies.

18 Claims, 4 Drawing Sheets

US 8,492,730 B2

NEUTRON DETECTORS COMPRISING ULTRA-THIN LAYERS OF BORON POWDER

CROSS REFERENCE TO RELATED APPLICATION

This application is a continuation-in-part of U.S. patent application Ser. No. 12/797,414, filed Jun. 9, 2010, which in turn claims the benefit of priority of U.S. Patent Application 61/187,160, filed Jun. 15, 2009.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD OF THE INVENTION

The present invention relates to the field of neutron detection and in particular the preparation and use of neutron detectors employing boron-10 ($^{10}$B) powder.

BACKGROUND OF THE INVENTION

The world-wide shortage of $^3$He gave rise to urgent needs for highly sensitive neutron detectors having neutron/gamma discrimination similar to $^3$He detectors. The applications included safeguarding nuclear materials and weapons, treaty verification, anti-proliferation, and the recovery of lost military payloads. More recently, however, the desire to guard against nuclear smuggling, the potential use of a radiological weapon (so called "dirty" bombs), and other terrorist acts, has given rise to needs to perform neutron surveillance at border and port facilities, transportation systems and other places where large amounts of a cargo or people pass by or through on a regular basis. Such neutron surveillance must be accomplished without undue restriction or disruption of traffic flow and events.

One class of conventional neutron detector is the gas-filled counter, typically based on helium-3 gas contained in high pressure (around 2 bar) tubes. Despite the fact that the helium-3 filled drift tubes are sensitive to microphonics, high-pressure helium-3 drift tubes have the best overall performance compared with other methods; that is, thermal neutron efficiencies above 80% and excellent neutron/gamma discrimination. These types of conventional neutron detectors are effective and therefore are the preferred choice in many types of operations, including oil logging operations, cryogenics for low temperature physics research, and medical applications such as diagnosis of chronic obstructive pulmonary diseases. However, the supply of helium-3 is limited, and therefore, large scale deployment of helium-3 is not an option. Thus, alternatives to helium-3 based neutron detection are necessary to meet the needs of portal monitoring and other increasing demands.

Another class of conventional neutron detectors is scintillation-based detectors, which is based on photon-emitting transitions that occur in the wake of energetic charged nuclei released from collisions between incident neutrons and atomic nuclei. Scintillation devices include a transparent neutron sensitive material (either a gas or a liquid or solid) that generates light upon receipt of incident neutrons. The scintillation devices are typically coupled to a photomultiplier tube to generate an analog electrical signal based on the production of the light within the scintillation material. The analog signal is indicative of the incident neutron irradiation. To enhance the efficiencies of the scintillators, the neutron sensitive materials are typically doped with lithium-6 and boron-10. However, neutron/gamma ray discrimination remains an issue for scintillators, and must be resolved in order for scintillators to becoming practical for helium-3 replacement.

Yet another class of neutron detectors includes solid state neutron detection devices based on thin films of boron-10 or lithium-6 coated onto silicon and other substrates. These devices usually use enriched $^{10}$boron or lithium-6 for highest efficiency possible. However, the highest theoretical efficiency for a single layer is limited to only a few percent. Meanwhile, charge losses in the substrate also limit the ultimate efficiency for multi-layer approaches.

Previous work describes a process of preparing efficient and inexpensive boron detectors for neutrons which includes a powder coating process for deposition of $^{10}$boron and/or $^{10}$boron carbide onto a conductive substrate. Alternatively, multiple coated substrates may be stacked, so as to improve efficiency. The present invention describes an improvement to this approach.

SUMMARY OF THE INVENTION

The present invention provides a process of preparing efficient and inexpensive boron detectors for neutrons which includes an ultra-thin powder coating of $^{10}$boron and/or $^{10}$boron carbide onto a conductive substrate, and a process for deposition of said ultra-thin coatings. Alternatively, multiple coated substrates may be stacked, so as to improve efficiency. Specifically, it has unexpectedly been found that a coating having a thickness of from about 50 nm to about 250 nm may significantly increase efficiency.

The following describe some non-limiting embodiments of the present invention.

According to a first embodiment of the present invention, a high-efficiency neutron detector substrate assembly is provided, comprising a first conductive substrate, wherein a first side of the substrate is in direct contact with a first layer of a powder material having a thickness of from about 50 nm to about 250 nm and comprising $^{10}$boron, $^{10}$boron carbide or combinations thereof, and a conductive material in proximity to the first layer of powder material.

According to another embodiment of the present invention, a neutron detector substrate assembly is provided, comprising a first conductive substrate having two opposing sides, wherein each opposing side is in direct contact with a layer of a powder material having a thickness of from about 50 nm to about 250 nm and comprising $^{10}$boron, $^{10}$boron carbide or combinations thereof; and, at least one additional conductive substrate having two opposing sides, wherein each opposing side is in direct contact with a layer of a powder material comprising $^{10}$boron, $^{10}$boron carbide or combinations thereof; and, wherein two layers of the powder material comprising $^{10}$boron, $^{10}$boron carbide or combinations thereof, which are in direct contact with different substrates, and are each in proximity to a conductive material therebetween.

According to yet another embodiment of the present invention, a process of preparing a high efficiency neutron detector substrate assembly is provided, comprising applying a layer of a powder material having a thickness of from about 50 nm to about 250 nm and comprising $^{10}$boron, $^{10}$boron carbide or combinations thereof, to at least one conductive substrate at ambient temperature and pressure and placing said conductive substrate in proximity to a conductive material.

DETAILED DESCRIPTION OF THE INVENTION

The present invention relates to substrate assemblies and the preparation thereof, which are suitable for use in high efficiency neutron detectors comprising boron. Neutron detectors comprising boron usually have low efficiencies, i.e., generally less than about a few percent. The present invention describes an inexpensive process that can produce substrate assemblies for neutron detectors with efficiencies approaching that of 1 bar 2-in diameter $^3$He tubes and with superior gamma-discrimination, due to the larger Q-value at 2.79 MeV. The process of preparation is scalable to large detector sizes and is non-hazardous and non-toxic.

The process of the present invention comprises applying at ambient temperatures and pressure a powder of a material comprising an amount of either $^{10}$boron or $^{10}$boron carbide ("boron-containing material"), which is sufficient to result in a layer of boron-containing material having a desired thickness on a conductive substrate. In one embodiment, an adhesive material may be applied to the substrate prior to application of the $^{10}$boron or $^{10}$boron carbide, such that the adhesive material is in direct contact with both the substrate and the boron-containing material. Herein, by "direct contact" is meant that the addition of intervening layers is precluded.

The boron-containing material is enriched with boron-10 ($^{10}$B). By "enriched" is meant that the boron-containing material comprises from about 20% to about 100% of $^{10}$B. The layer of boron-containing material has an average thickness of from about 50 nm to about 1 μm, alternatively from about 50 nm to about 250 nm, and alternatively of about 100 nm. The boron-containing powder material of the present invention has an average particle size of from about 0.7 μm to about 10 μm, and alternatively is about 0.7 μm.

Suitable conductive substrates include but are not limited to aluminum plates, aluminized mylar sheets, and/or thin aluminum foils. In one embodiment, the substrate is an aluminum plate. The aluminum plate may have a thickness of about 1/32 inch.

Suitable adhesives include but are not limited to adhesive tape, such as Scotch™ tapes, conducting copper tape, and/or aluminum tape.

Figure 1:
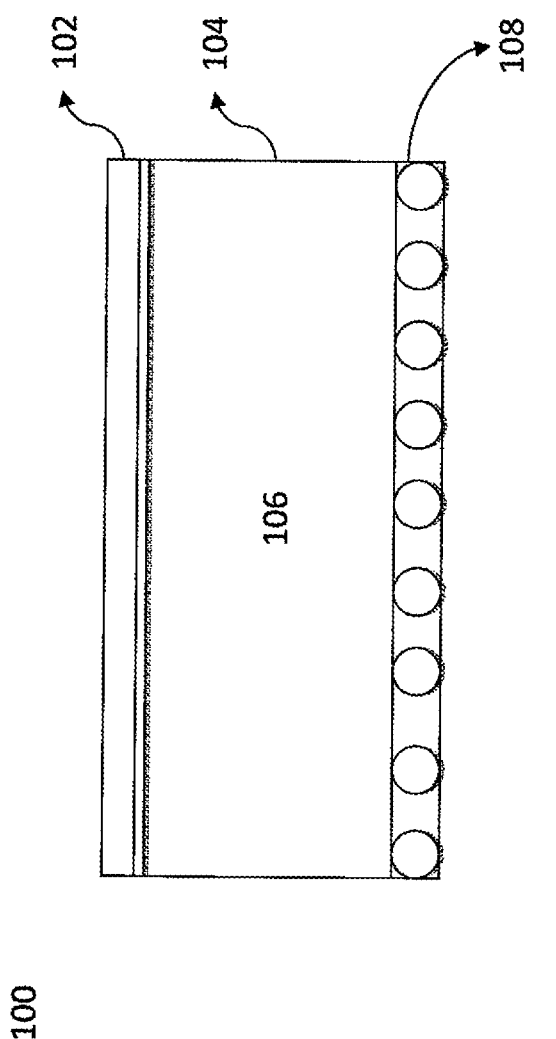
FIG. 1 depicts one embodiment of the neutron detector substrate assembly of the present invention comprising a single conductive substrate having on one side a layer of boron-containing material. A conducting wire or grid, which is connected to a high voltage source (not shown) is in proximity to the layer of boron-containing material.
Figure 2:
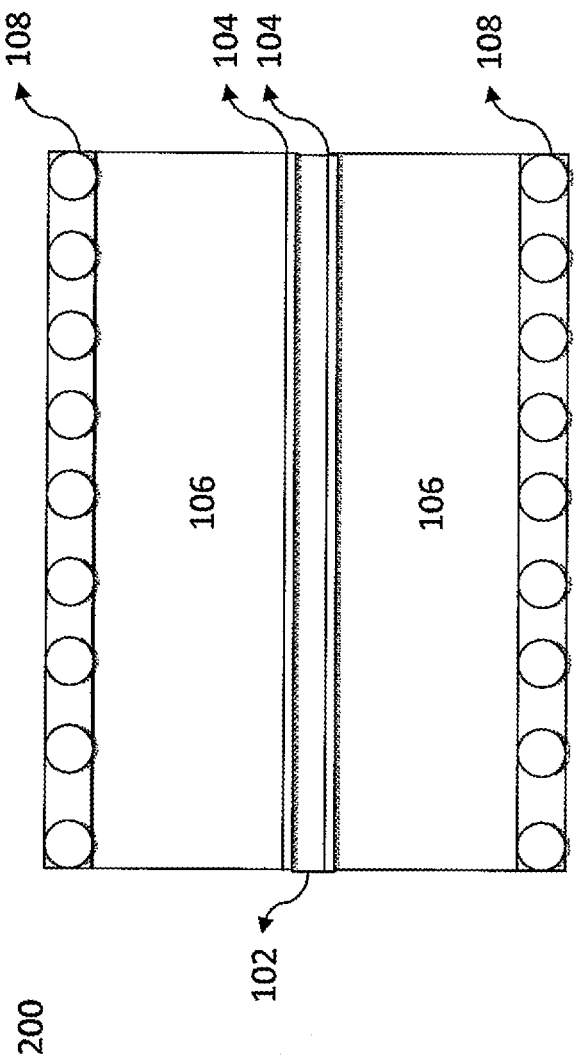
FIG. 2 depicts an alternative embodiment of the neutron detector substrate assembly of the present invention comprising a single conductive substrate having a layer of boron-containing material on both sides of the substrate. A conducting wire or grid, which is connected to a high voltage source (not shown) is in proximity to both layers of boron-containing material.

In all embodiments of the present invention, the layer of boron-containing material is in proximity to a high voltage conductor. The conductor may be in the form of one or more wires, a grid, a plate, or other functionally equivalent form, where "proximity" is understood to mean that the layer of boron-containing material is substantially parallel to the high voltage conductor, is not in direct contact with the conductor, and is separated from the conductor by a distance no greater than about 10 mm. The high voltage conductor and substrate are surrounded by a gas, which fills the detector (not shown) comprising the substrate assembly. In one embodiment, the gas is a mixture comprising $C_2H_6$ (5%), $CF_4$ (40%), and argon (55%). FIG. 1 depicts one embodiment of a single-substrate assembly configuration (100), wherein conducting substrate (102) is in direct contact with a layer of boron-containing material (104), which in turn is in proximity to a high-voltage conducting wire grid (108). The wire grid is surrounded by a gas mixture (106) which fills the detector. FIG. 2 depicts an alternative embodiment of a single-substrate assembly configuration (200), in which both sides of a conducting substrate (102) are in direct contact with a layer of boron-containing material (104), both of which in turn are in proximity to a high-voltage conducting wire grid (108). The wire grids are surrounded by a gas mixture (306), which fills the detector (not shown) comprising the substrate assembly.

Figure 3:
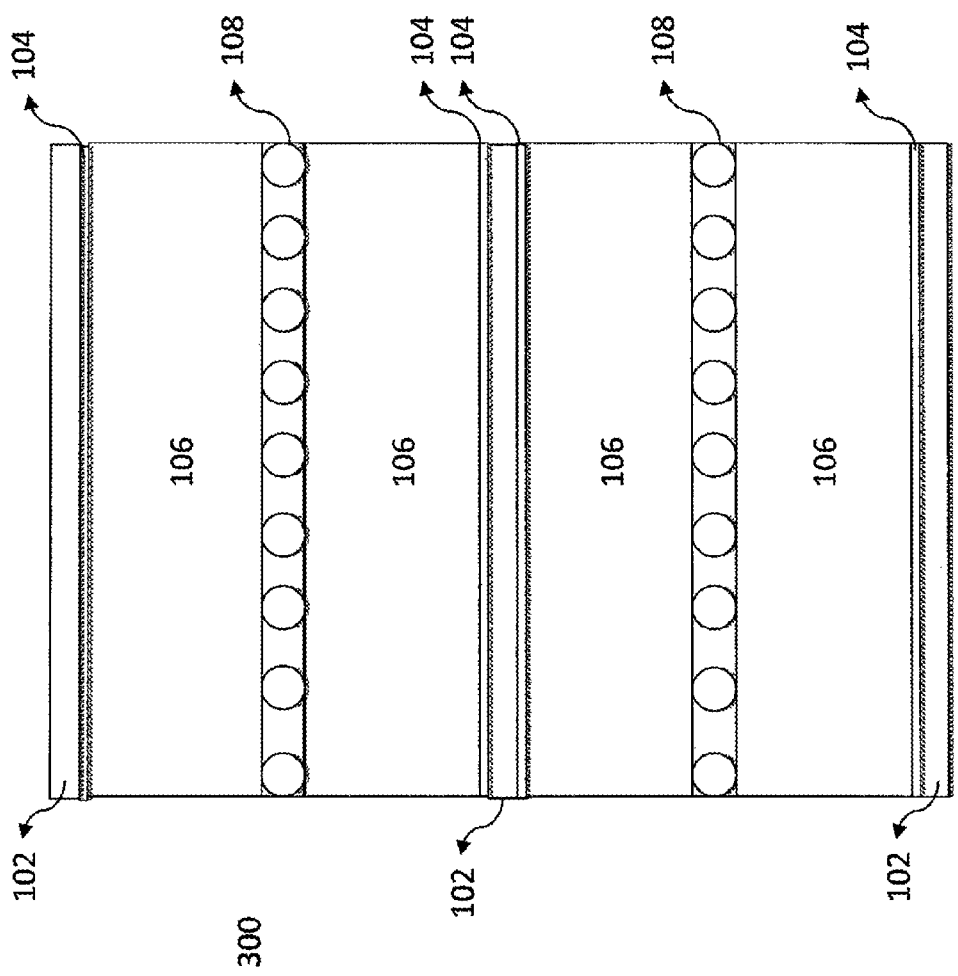
FIG. 3 depicts yet another alternative embodiment of the neutron detector substrate assembly of the present invention, comprising multiple conductive substrates, in which each layer of boron-containing material is in proximity to a conducting wire or grid, which is connected to a high voltage source (not shown).

In an alternative embodiment of the present invention, a multi-substrate assembly is provided, as depicted in FIG. 3 ("sandwich" configuration). In this embodiment (300), a layer of boron-containing material (104) is applied to one or both sides of a conductive substrate (102), and is in direct contact therewith. As with the single layer of boron-containing material, a layer of adhesive material may be applied to the substrate prior to application of the boron-containing material. The layer of boron-containing material is in proximity to a high-voltage conducting wire grid (108), which in turn is surrounded by a gas mixture (106) which fills the detector. In theory, the number of substrates in such a configuration is unlimited, yet for the purposes of the present invention, the number of substrates comprises from about 2 to about 20, and alternatively from 2 to about 10. One advantage of a multi-substrate assembly is increased efficiency.

Another alternative embodiment comprises a non-conducting substrate comprising at least one portion coated with boron powder at ground electrical potential and at least one portion of the substrate connected to high-voltage. Thus, there would be no high-voltage conductors, as used in the sandwich configuration. In one embodiment, the portion of boron coated substrate at ground potential is much greater than the high-voltage portion. In one embodiment, the high voltage portion is less than about 5% of the total substrate area.

The thin films comprising the boron-containing material can be prepared directly in air at ambient temperature. The powder coating process requires gas flow, and in one embodiment, the gas is argon. The preparation process does not require a vacuum system for thin film deposition such as is typically required for sputtering processes, electron beam processes and for chemical vapor deposition processes.

Powder coating, as a physical deposition process, is simpler and less expensive than other deposition methods due to the fact that no vacuum system is required. Besides the basic simplicity of a powder coating approach, powder coating allows inexpensive preparation of large area thin films due to low energy consumption, as the process does not require the breaking of chemical bonds to form boron ions, boron atoms or boron nanoparticles. Also, powder coating processes generally have high efficiency material usage and a relatively low waste stream. In electrostatic boron powder spray coating, boron powder particles are forced (by a compressed gas such as argon) to flow around a charged metal tip, which is biased at up to +100 kV electrostatic potential in commercial powder spray guns, and acquire positive charges after contacting the metal tip. Not all of the standard powder coating procedures can be directly used for boron powder, which is one of the hardest materials and has a very high melting temperature of 2349 K. Therefore, standard curing processes which involve heating after coating are ineffective with boron powders.

The boron powder coated substrates are placed inside a sealed container to form a detector. The geometry for the detector comprising the substrate assemblies may be either planar or cylindrical, and the operation of each detector is the same as for drift-tube detectors, as would be understood by one of skill in the art. One or more anode wires, wire grids, or the equivalent thereof, are placed at a distance of about 10 mm or less from the substrate, and a gas mixture fills the container. The gas mixture is used to capture all charges, such as alpha particles and $^7$Li particles, which are created in a neutron capture event by the boron-containing thin film. One non-limiting example of a suitable gas mixture comprises $C_2H_6$ (5%), $CF_4$ (40%), and argon (55%). An electrical bias of from about 0.5 kV to about 2 kV is applied between the thin boron film and the anode and can serve to collect charges or amplify the electrical pulses (for higher voltages exceeding 1 kV) generated from neutron capture events. The charged particles produce an electrical response on one or more anode wires. A single neutron detector of the present invention may include a single substrate comprising at least one layer of boron-containing material thereon, and at least one wire. Alternatively, a single neutron detector may comprise two or more stacked substrates, and form sandwich configuration with anode wire planes. In one embodiment, at least two neutron detection cells are placed in a serial configuration, which results in an efficiency of greater than 10%.

The efficiency of charged particle capture by the detector of the present invention is at least 90%, and alternatively is at least 99%.

Examples

Single-Substrate Detector

A Wagner powder gun was used to coat 0.5-0.7 mm boron powder particles. Pressurized argon at 80-120 psig was connected to the powder gun through the control unit of the powder gun. The argon gas blows the boron powder past through a metal tip at the gun nozzle, which is at a nominal electric potential of +80 to +100 kV. Corona discharges can be seen with naked eyes around the metal tip. The tenuous discharges correspond to a DC current of a few mA. Besides charging the powder, another expected function of the gun tip is to break the clumped powder into individual powder particles (or smaller clusters) and form a powder cloud. The collimated powder cloud coats the grounded metal surfaces within a few seconds or less time. Excessive powder came off the surfaces like a smoke. The boron coatings show rich textures to naked eyes, excessive boron powder tends to agglomerate and form clumps much greater than individual powder particles on the surfaces. These agglomerated powders come off the surfaces easily (by shaking, for example). Meanwhile, a thin and uniform powder layer is observed to stick to the surfaces better, but can be wiped off the surface.

By adding an adhesive layer to the substrate, the powder coating better adheres to the surface.

Following deposition of natural boron powder particles, various tests were conducted. FIG. 1 shows a plot of energy deposition (in MeV's) versus total counts and shows the gamma-discrimination achieved by the boron detectors prepared by the process of the present invention. FIG. 2 shows a plot of total film thickness (in microns) versus efficiency and shows the boron detector relative efficiency achieved by the natural boron detectors prepared by the process of the present invention in comparison to the theoretical model for efficiency. The points marked with the pluses and triangles show the results from the single boron layer.

Multi-Substrate Detectors

The efficiencies of multi-substrate assemblies for neutron detection were examined both theoretically and experimentally. Due to the charged particle losses in the boron layers and substrates, a practical intrinsic thermal-neutron efficiency limit of 42% has been found for multi-layer $^{10}$B detectors, much less than the 77% of the 2-bar 2" diam. $^3$He detectors.

The film thickness (T) should be comparable to the ranges ($R_0$) of the charged products, an alpha particle and a $^7$Li, from the neutron capture $^{10}$B(n, α)$^7$Li reaction. The alpha particle ranges in boron are 3.6 and 4.4 microns at 1.47 (94%) and 1.78 (6%) MeV respectively, and 1.9 and 2.2 microns for the 0.84 (94%) and 1.02 (6%) MeV $^7$Li, where the percentages are the production probabilities. 100 keV may be used as the lower energy threshold for ion detection, which is still sufficiently high compared with γ-induced electrons in an ionization chamber.

A 1/32"-thick aluminum plate was coated with boron-10 powder and the plates used in a planar ionization chamber configuration, which has been described previously in Morris et al., "Multi-Wire Proportional Chamber for Ultra-cold Neutron Detection," Nucl. Instrum. Method. A, 599 (2009) pp. 248-250, one difference being that there is no $^3$He in the gas mixture. For multiple layers, we sandwiched a high-voltage (HV) wire array at about 1.6 kV in between two boron-coated substrates. Up to four layers have been examined so far, with a boron-to-HV plate separation of about 3.3 mm. Uniformity of the spacing (about 10% error or less) is critical for a uniform response among different coated layers. Typical pulse height spectra for a four-layer configuration are shown for $^{10}$B and natural B, in comparison with a single layer. The results indicate excellent n/γ discrimination, as expected of an ionization chamber. We also found that the multi-layer configuration can increase the detector efficiencies up to the theoretical limit of 42%, as expected.

Figure 4:
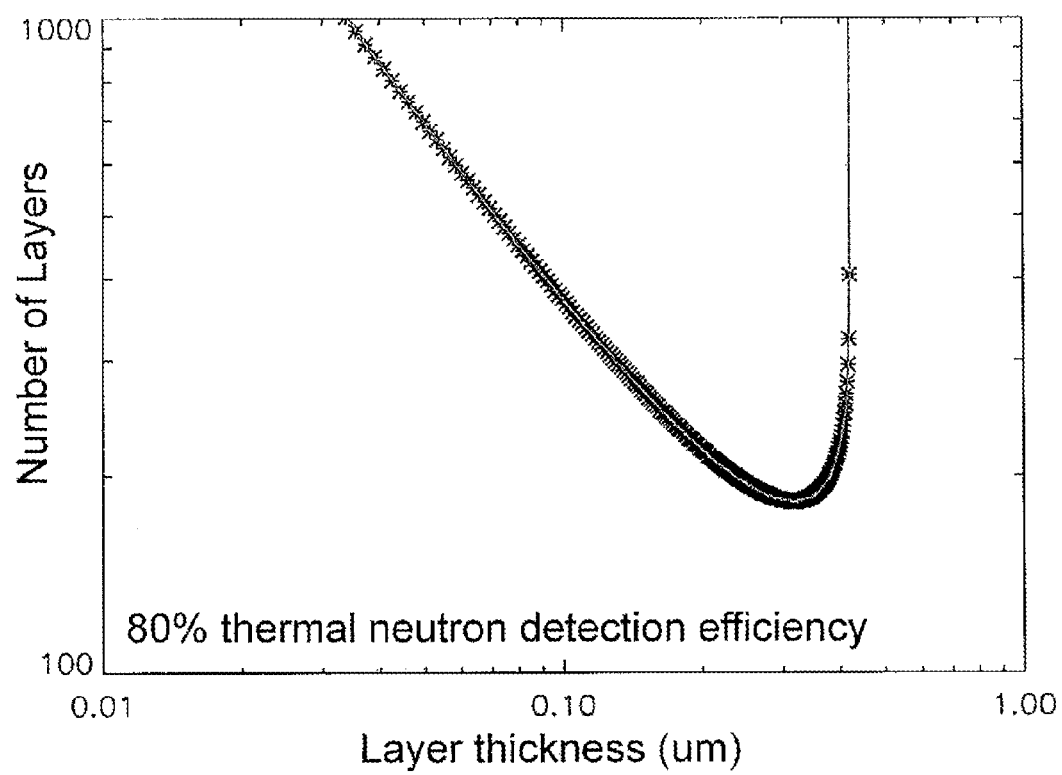
FIG. 4 depicts the 80% thermal neutron detection efficiency level plotted as a function of the number of layers vs. layer thickness in μm.

The detector of the present invention, which utilizes ultra-thin layers can in principle achieve efficiencies approaching 100%, much greater than the 42% limit for micron or thicker films. An example is given in FIG. 4, which shows that there are different approaches to achieve 80% efficiencies. FIG. 4 depicts the number of layers needed as a function of the layer thickness to achieve thermal neutron detection efficiency of 80%.

In all embodiments of the present invention, all percentages are by weight of the total composition, unless specifically stated otherwise. All ratios are weight ratios, unless specifically stated otherwise. All ranges are inclusive and combinable. All numerical amounts are understood to be modified by the word "about" unless otherwise specifically indicated. All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

Whereas particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A high-efficiency neutron detector substrate assembly comprising a first conductive substrate, wherein a first side of the substrate is in direct contact with a first layer of a powder material having a thickness of from about 50 nm to about 250 nm and comprising $^{10}$boron, $^{10}$ boron carbide or combinations thereof, a second layer of powder material having a thickness of from about 50 nm to about 250 nm, and comprising $^{10}$boron, $^{10}$boron carbide or combinations thereof in direct contact with a second side of the first conductive substrate, and a conductive material in proximity to the first layer of powder material.

2. The substrate assembly of claim 1, wherein the powder material comprises from about 20% to about 100% of $^{10}$boron, $^{10}$boron carbide or combinations thereof.

3. The substrate assembly of claim 1, wherein the layer of powder material has an average thickness of about 100 nm.

4. The substrate assembly of claim 1, wherein the powder material comprises particles having an average particle size of from about 0.1 μm to about 10 μm.

5. The substrate assembly of claim 1, further comprising a first layer of adhesive material in direct contact both with the first side of the first conductive substrate and with the powder material.

6. The substrate assembly of claim 1, further comprising a second layer of adhesive material in direct contact with both the second side of the first conductive substrate and with the second layer of powder material comprising $^{10}$boron, $^{10}$boron carbide or combinations thereof.

7. The substrate assembly of claim 1, wherein the conductive material is in the form of one or more wires, a grid, or a plate, and is connectable to a high-voltage source.

8. A neutron detector substrate assembly comprising:
   a) a first conductive substrate having two opposing sides, wherein each opposing side is in direct contact with a layer of a powder material having a thickness of from about 50 nm to about 250 nm, and comprising $^{10}$boron, $^{10}$boron carbide or combinations thereof; and,
   b) at least one additional conductive substrate having two opposing sides, wherein each opposing side is in direct contact with a layer of a powder material comprising $^{10}$boron, $^{10}$boron carbide or combinations thereof;
   wherein two layers of the powder material comprising $^{1\text{-}}$boron, $^{10}$boron carbide or combinations thereof, which are in direct contact with different substrates, are each in proximity to a conductive material therebetween.

9. The substrate assembly of claim 8, further comprising a layer of adhesive material in direct contact both with at least one side of one conductive substrate and with at least one layer of the powder material comprising $^{10}$boron, $^{10}$boron carbide or combinations thereof.

10. The substrate assembly of claim 8, wherein the powder material comprises from about 20% to about 100% of $^{10}$boron, $^{10}$boron carbide or combinations thereof.

11. The substrate assembly of claim 8, wherein the layer of powder material has an average thickness of from about 100 nm.

12. The substrate assembly of claim 8, wherein the powder material comprises particles having an average particle size of from about 0.1 μm to about 10 μm.

13. A process of preparing a high efficiency neutron detector substrate assembly comprising applying a first layer of a powder material having a thickness of from about 50 nm to about 250 nm and comprising $^{10}$boron, $^{10}$boron carbide or combinations thereof, to a first conductive substrate at ambient temperature and pressure and placing said conductive substrate in proximity to a conductive material; and arranging the first conductive substrate with respect to a second conductive substrate having two opposing sides, wherein each opposing side is in direct contact with a second and third layer of a powder material having a thickness of from about 50 nm to about 250 nm and comprising $^{10}$boron, $^{10}$boron carbide or combinations thereof; and, wherein two of the first, second and third layers of the powder material, which are in direct contact with at least one of the first or second conductive substrates, are in proximity to a conductive material therebetween.

14. The process of claim 13, wherein an adhesive material is applied in direct contact with the conductive substrate prior to application of the powder material comprising $^{10}$boron, $^{10}$boron carbide or combinations thereof.

15. The process of claim 13, wherein the powder material comprises from about 20% to about 100% of $^{10}$boron, $^{10}$boron carbide or combinations thereof.

16. The process of claim 13, wherein the layer of powder material comprising $^{10}$boron, $^{10}$boron carbide or combinations thereof has an average thickness of about 100 nm.

17. The process of claim 13, wherein the powder material comprises particles having an average particle size of from about 0.1 μm to about 10 μm.

18. The process of claim 13, further comprising applying an adhesive material in direct contact with at least one of the first or second conductive substrates prior to application of the powder material.

* * * * *